US008365680B2

(12) United States Patent
Fukuda et al.

(10) Patent No.: US 8,365,680 B2
(45) Date of Patent: Feb. 5, 2013

(54) POINTER ILLUMINATION STRUCTURE

(75) Inventors: Taisei Fukuda, Shizuoka (JP);
Tomohiro Sugiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 29 days.

(21) Appl. No.: 13/002,775

(22) PCT Filed: Jun. 23, 2009

(86) PCT No.: PCT/JP2009/061428
§ 371 (c)(1),
(2), (4) Date: Jan. 6, 2011

(87) PCT Pub. No.: WO2010/010777
PCT Pub. Date: Jan. 28, 2010

(65) Prior Publication Data
US 2011/0114009 A1    May 19, 2011

(30) Foreign Application Priority Data

Jul. 23, 2008  (JP) ................................. 2008-189514

(51) Int. Cl.
*G12B 11/04* (2006.01)
(52) U.S. Cl. .......................... 116/288; 116/284; 116/286
(58) Field of Classification Search .......... 116/284–288, 116/62.1, DIG. 6, DIG. 36; 362/26
See application file for complete search history.

(56) References Cited

U.S. PATENT DOCUMENTS

| | | | | |
|---|---|---|---|---|
| 5,062,135 | A * | 10/1991 | Ohike | 324/154 R |
| 5,603,283 | A | 2/1997 | Owen | |
| 6,520,108 | B1 * | 2/2003 | Komura | 116/284 |
| 6,520,109 | B2 * | 2/2003 | Komura | 116/288 |
| 6,538,423 | B1 * | 3/2003 | Sato et al. | 324/146 |
| 6,598,988 | B1 * | 7/2003 | Noll et al. | 362/26 |

(Continued)

FOREIGN PATENT DOCUMENTS

| | | |
|---|---|---|
| CN | 2219832 Y | 2/1996 |
| JP | 62-35277 U | 3/1987 |
| JP | 8-82534 A | 3/1996 |
| JP | 11-311547 A | 11/1999 |
| JP | 2001-327150 A | 11/2001 |

OTHER PUBLICATIONS

International Search Report [PCT/ISA/210] dated Jul. 21, 2009 issued in corresponding application No. PCT/JP2009/061428.

(Continued)

*Primary Examiner* — Peter Macchiarolo
*Assistant Examiner* — Tania Courson
(74) *Attorney, Agent, or Firm* — Sughrue Mion, PLLC

(57) ABSTRACT

Provided is a pointer illumination structure which is simple, and in which a rotary part including a pointer body can be made lightweight. A containing cover 20 of a pointer movement 1 contains a rotation driving mechanism including a rotor 32 and an intermediate gear 33, an output gear 34, and so on. The rotation driving mechanism transmits rotation based on a measured amount to the output gear 34, and rotates a pointer body 10 supported by a bearing 22c, by way of the output gear 34. The bearing 22c rotatably supports a shaft 11 of the pointer body 10. A pointer 12 of the pointer body 10 indicates a measuring value according to rotation of the pointer body 10 around the shaft 11. A light source 13 is provided for illuminating the pointer 12 of the pointer body 10. In the pointer movement 1, the bearing 22c is formed of a material through which light from the light source 13 can pass, and integrally formed with the lower cover 22 of the containing cover 20 at a position more adjacent to the light source 13 than the shaft 11 of the pointer body 10, on an optical path.

3 Claims, 3 Drawing Sheets

U.S. PATENT DOCUMENTS

| | | | | |
|---|---|---|---|---|
| 6,640,743 | B2 * | 11/2003 | Nakane | 116/286 |
| 6,994,053 | B2 * | 2/2006 | Abe et al. | 116/284 |
| 7,503,278 | B2 * | 3/2009 | Sigg et al. | 116/284 |
| 7,520,242 | B2 * | 4/2009 | Vuilliomenet et al. | 116/288 |
| 7,703,410 | B2 * | 4/2010 | Fukuda et al. | 116/282 |
| 2011/0043345 | A1 * | 2/2011 | Strahm et al. | 340/438 |

OTHER PUBLICATIONS

Office Action, issued Mar. 12, 2012 by the State Intellectual Property Office of the People's Republic of China in counterpart Chinese Application No. 200980129041.8.

* cited by examiner (a)

(b)

though the pointer.

POINTER ILLUMINATION STRUCTURE

TECHNICAL FIELD

The present invention relates to a pointer illumination structure for illuminating a pointer which is rotated on a dial plate of a meter to indicate a measuring value, with a light which is irradiated from a light source and passes through the pointer.

BACKGROUND ART

In one of the pointer illumination structures of this type which have been conventionally known, a shaft of a pointer body is rotatably supported by a housing which contains an output gear to be integrally rotated with the shaft at a lower side of the shaft, and a stepping motor positioned adjacent to the output gear, and so on (refer to Patent literature 1). Specifically, the housing is composed of two upper and lower parts, which have openings respectively. Bearings (elements to be contacted with the openings) which are formed at upper and lower sides of the output gear are respectively engaged with the two openings. Inside the housing, a pinion gear at a motor shaft side of the stepping motor is meshed with the output gear at a side of the shaft of the pointer body. When the motor shaft rotates, the rotation is transmitted to the pointer (a part of the pointer body on the dial plate) by way of the pinion gear and the output gear.

Moreover, a light source on a printed board is disposed below the opening of the lower housing so as to irradiate the light to the output gear, and the output gear positioned at the lower side of the shaft of the pointer body is formed of a transparent material. The light irradiated from the light source passes the output gear and the shaft of the pointer body, and is reflected by a reflection face at an upper end side of the shaft inside the pointer body thereby to illuminate the pointer above the dial plate.

CITATION LIST

Patent Literature

Patent literature 1: U.S. Pat. No. 5,603,283

SUMMARY OF INVENTION

Technical Problem

In the pointer illumination structure in Patent literature 1, however, in order to allow the bearings formed at upper and lower sides of the output gear which is integral with the shaft of the pointer body to be engaged with the upper and lower openings of the two housings, it is necessary that a rotary part including the shaft and the output gear has a sufficient length in a vertical direction. As a result, a weight of the rotary part, that is, inertia when the pointer rotates is increased, and smooth rotation of the pointer is hindered. Further, in the pointer illumination structure, the bearings are exquisitely formed at upper and lower sides of the output gear, and complicated works of components are required.

An object of the invention is to provide a pointer illumination structure in which the above described problems can be solved.

Solution to Problem

In order to achieve the object, there is provided a pointer illumination structure according to the invention, including: a pointer body which includes a shaft and a pointer for indicating a measuring value according to its rotation around the shaft; a bearing which rotatably supports the shaft of the pointer body; a rotation driving mechanism for rotating the pointer body which is supported by the bearing; a containing cover which contains the rotation driving mechanism; and a light source for illuminating the pointer of the pointer body, wherein the bearing is formed of a light-transmissive material through which a light from the light source can pass, and the bearing is integrally formed with the containing cover at a position more adjacent to the light source than the shaft of the pointer body, on an optical path of the light.

Further, the pointer illumination structure is configured by including an output gear to which the rotation is transmitted from the rotation driving mechanism, a through hole being formed in the output gear, and in that the bearing is in a shape protruding from the containing cover toward the pointer body, and inserted into one end side of the through hole of the output gear thereby to rotatably support the output gear, and the shaft of the pointer body is inserted into the other end side of the through hole of the output gear to be fixedly attached to the output gear.

Further, the pointer illumination structure is configured in that the containing cover includes a lower cover which is integrally formed with the bearing, and an upper cover which is provided with a tubular protruding part protruding toward the pointer body, and a protruding part of the output gear which defines the other end side of the through hole of the output gear is engaged with an inside of the tubular protruding part.

Advantageous Effects of Invention

In the pointer illumination structure according to the invention, the bearing which rotatably supports the shaft of the pointer body is integrally formed with the containing cover, and therefore, the structure is simple and can be easily produced. Moreover, a length of the shaft of the pointer body can be reduced, by disposing the bearing close to the pointer body, and therefore, a rotary part including the pointer body can be made lightweight.

DESCRIPTION OF EMBODIMENTS

Figure 1:
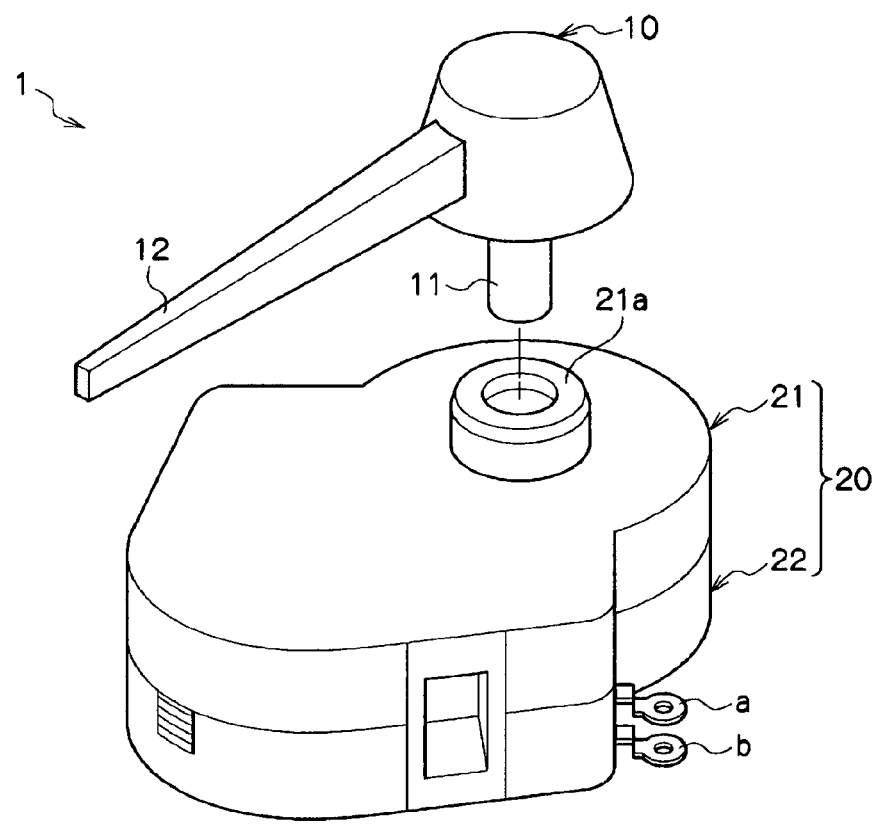
FIG. 1 shows an outlook view (a) and a cross-sectional view (b) of a pointer movement according to the invention.
Figure 1:
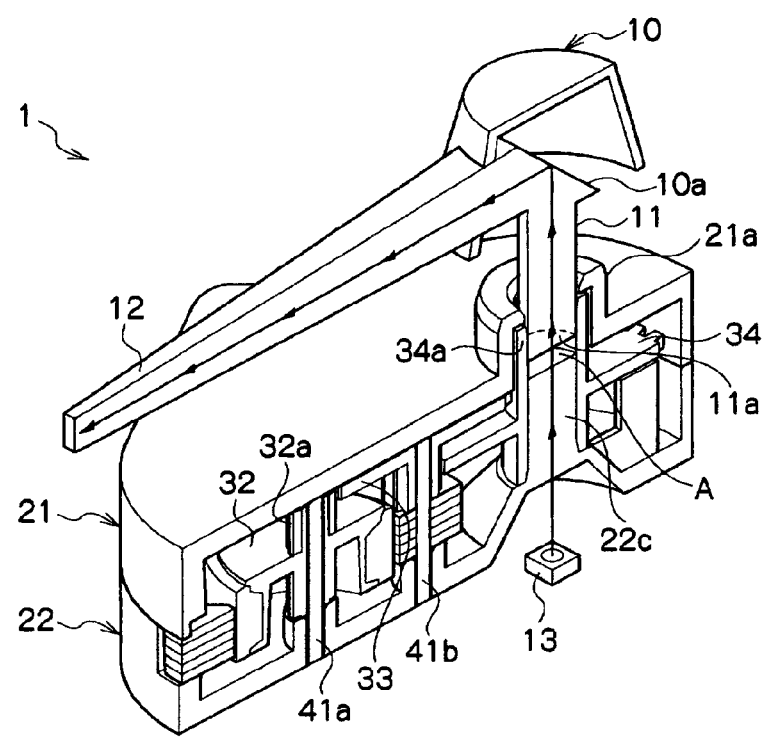

Now, embodiments according to the invention will be described referring to the drawings. It is to be noted that the drawings include those parts which are schematically exaggerated, for the purpose of making structure or advantage of the invention easily understandable.

(Embodiment)

A pointer movement of a meter to which the pointer illumination structure according to the invention is applied will be described referring to FIGS. 1 to 3. As shown by (a), (b) in FIG. 1 and in FIG. 2, the pointer movement 1 includes a pointer body 10 in a substantially L-shape. The pointer body 10 can be rotated around a shaft 11, and the shaft 11 extends from a base end of a pointer 12 in one direction (downward in the drawings). A distal end of the pointer 12 is adapted to indicate a measuring value above a dial plate (not shown) according to its rotation.

Further, the pointer body 10 can pass a light, and the pointer movement 1 is provided with a light source 13. The pointer body 10 (a tip end of the pointer body 10) is illuminated with the light irradiated from the light source 13. The light source 13 may be an LED on a printed board, which is not shown. As materials for the pointer body 10, a) polycarbonate for the shaft 11 and acryl resin for the pointer 12, b) polycarbonate for both the shaft 11 and the pointer 12, or c) acryl resin for both the shaft 11 and the pointer 12 may be used.

Figure 3:
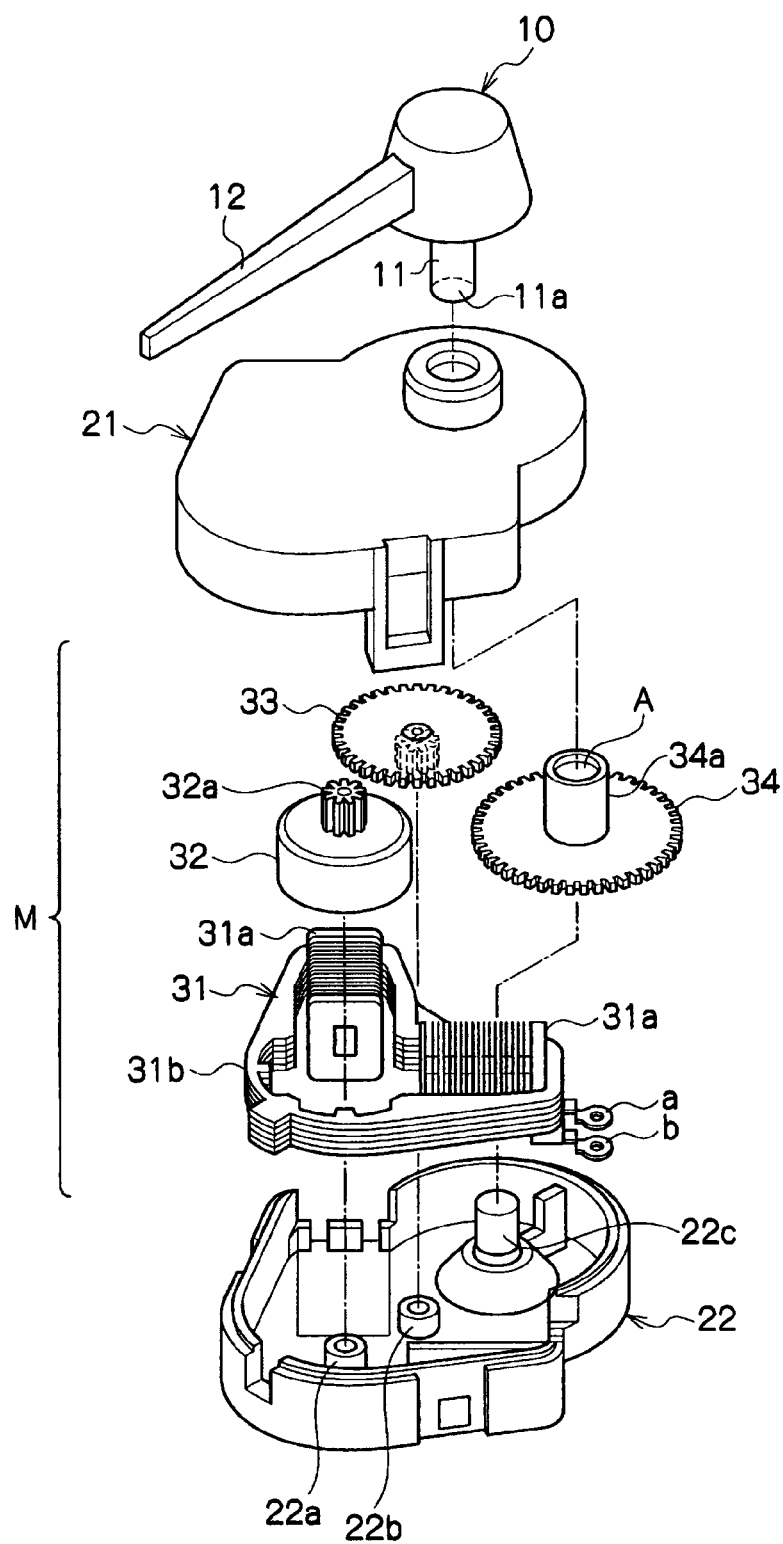
FIG. 3 shows structure of components of the pointer movement according to the invention.

A containing cover 20 for the pointer movement 1 is formed of an upper cover 21 and a lower cover 22, and contains therein a rotation driving mechanism M, an output gear 34 and so on, as shown in FIG. 3. Engaging parts which are respectively provided on a lower edge of the upper cover 21 and on an upper edge of the lower cover 22 are engaged with each other thereby to close the upper cover 21 and the lower cover 22. The upper cover 21 may be formed of non-transparent material such as denatured polyphenylene ether (denatured PPE), and the lower cover 22 may be formed of polycarbonate or acryl resin. (In the conventional pointer movement, the denatured PPE is used for both the upper cover and the lower cover.)

The pointer movement 1 in this embodiment has characteristics in the output gear 34 which is integrally rotated with the shaft 11 of the pointer body 10, and a bearing 22c for supporting the output gear 34. The rotation driving mechanism M generates the rotation on the basis of an electric signal indicating a measured amount, and transmits the rotation to the output gear 34.

More specific description is made as follows. (1) The rotation driving mechanism M is substantially the same as the one included in the known stepping motor, and the same mechanism as a mechanism for transmitting rotation to a pointer gear of an output shaft, for example, in a stepping motor which is disclosed in JP-A-2001-327150, may be employed. Briefly speaking, the rotation driving mechanism M includes a coil stator assembly (coil stator unit) 31, a rotor 32, and an intermediate gear 33 in FIG. 3, a rotor shaft 41a and an intermediate gear shaft 41b by (b) in FIG. 1, and so on. The coil stator assembly 31 (in FIG. 3) includes two coils 31a and a stator 31b, and the two coils 31a have two terminals a and b, respectively. The rotor 32 is supported by the rotor shaft 41a ((b) in FIG. 1) and a bearing 22a provided on the lower cover 22, and the intermediate gear 33 is rotatably supported by the intermediate gear shaft 41b ((b) in FIG. 1) and the bearing 22b. When an electric signal is supplied between the terminals a and b of the respective coils 31a, a magnetic force is generated, and the rotor 32 is rotated by the magnetic force. The rotation is transmitted to the output gear 34 by way of the rotor gear 32a of the rotor 32 and the intermediate gear 33.

Figure 2:
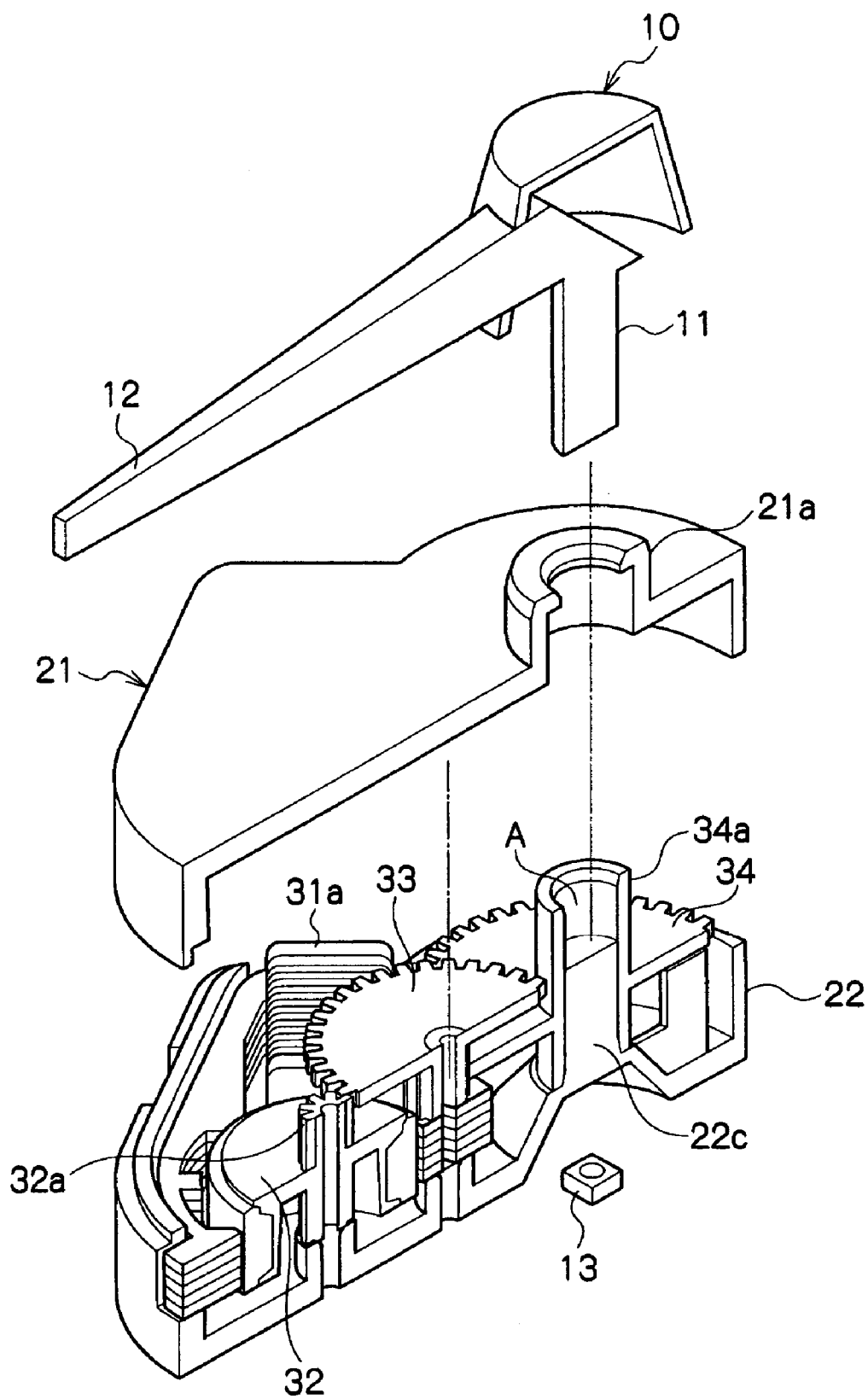
FIG. 2 is a cross-sectional view showing the pointer movement in a state where an upper cover of a containing cover is detached.

(2) The output gear 34 is fixed to the shaft 11 of the pointer body 10 so as to be integrally rotated with the shaft 11 ((b) in FIG. 1). Moreover, the output gear 34 is rotatably supported by the bearing 22c, and transmits the rotation from the rotation driving mechanism M to the shaft 11 of the pointer body 10. Specifically speaking, the bearing 22c is integrally formed with the lower cover 22 in a shape protruding upward from the lower cover 22, and rotatably supports the shaft 11 of the pointer body 10 by way of the output gear 34. The rotation from the rotation driving mechanism M is transmitted to the pointer body 10 which is integral with the output gear 34 and supported by the bearing 22c, and hence, the pointer 12 of the pointer body 10 is rotated.

The structure for transmitting the rotation from the output gear 34 to the shaft 11 of the pointer body 10 will be more specifically described below. The output gear 34 is provided with a through hole A, as shown in FIG. 2. The bearing 22c is inserted into the through hole A of the output gear 34 from a lower end side thereof to rotatably support the output gear 34. On the other hand, the shaft 11 of the pointer body 10 is inserted into the through hole A from its upper end side, and a lower end part of the shaft 11 is press-fitted or bonded to the through hole A. Further, the upper cover 21 has a tubular protruding part 21a which protrudes upward in a tubular shape, and a protruding part 34a at an upper side of the output gear 34 is engaged with an inside of the tubular protruding part 21a of the upper cover 21. The engagement between the protruding part 34a of the output gear 34 and the tubular protruding part 21a of the upper cover 21 restricts movement of the output gear 34 in an upper part inside the containing cover 20, and effectively assists the output gear 34 to be supported by the bearing 22c of the lower cover 22.

A path of the light from the light source 13 is confirmed as follows. As shown by (b) in FIG. 1, a position where the bearing 22c is provided in the lower cover 22 is more adjacent to the light source 13 than the shaft 11 of the pointer body 10 on an optical path of the light. The bearing 22c and the lower cover 22 which are integrally formed with each other permit the light from the light source 13 to pass them through, as described above. In this embodiment, the light from the light source 13 first passes an inside of the bearing 22c, and arrives at an incident face 11a at a lower end of the shaft 11 of the pointer body 10. Further, the light proceeds upward inside the shaft 11, and turned around by a reflection face 10a at an upper end of the shaft 11 to be guided to a distal end side of the pointer 12.

In the pointer movement 1 as described above, the bearing 22c which rotatably supports the shaft 11 of the pointer body 10 is integrally formed with the lower cover 22 of the containing cover 20. Therefore, the structure is simple and can be easily produced. Further, in the pointer movement 1, by remarkably protruding the bearing 22c so as to be close to the pointer body 10, a length of the shaft 11 of the pointer body 10 can be reduced, and therefore, the rotary part including the pointer body 10 can be made lightweight. By thus making the rotary part lightweight, the inertia when the pointer is rotated is reduced. In this manner, it is possible to make the rotation smooth, even when the measuring value abruptly fluctuates. Moreover, because the inertia of the rotary part is reduced, it is possible to prevent loss of synchronism between a control pulse of the electric signal to the two coils 31a and the rotation of the rotor 32, that is, to enhance anti desynchronizing performance, even though the measuring value is abruptly varied.

In the conventional pointer illumination structure, the bearings are exquisitely formed at upper and lower sides of the output gear, the components are worked in a complicated manner, and moreover, it takes a lot of time to assemble the components. Additionally, in the conventional pointer illumination structure, the rotary part is heavy, because it is necessary that the rotary part including the shaft of the pointer body and the output gear has a considerable length in the vertical direction. These disadvantages are solved in the pointer movement 1 according to the invention.

(Other Embodiments)

Although the invention has been described by way of the specific embodiment in the foregoing, the invention is not limited to the above described embodiment. The invention can be also carried out by modifying the embodiment in a scope not deviating from gist of the invention.

a) For example, the bearing 22c is formed in a convex shape protruding from the lower cover 22, but the bearing 22c may be formed in a concave shape recessed from the lower cover 22. In the latter case, the lower part of the output gear 34 is formed in a convex shape so as to be engaged with the concave shape of the bearing.

b) The bearing 22c is integrally formed with the lower cover 22, and the whole integrally formed unit is formed of the transparent material. To the contrary, only a part corresponding to the bearing may be formed of the transparent material.

c) It is presumed that the pointer body 10 and the bearing 22c are transparent (may be semitransparent), and those parts except the pointer body 10 and the bearing 22c are not transparent. However, it is also possible to form the shaft of the pointer body, the bearing or so in a hollow shape out of opaque material, and to permit the light from the light source to pass them through.

d) Although not specifically described in the above described embodiment, a dial plate is provided above the pointer 12 or between the pointer 12 and the upper cover 21 ((a) in FIG. 1). In case where the dial plate is provided above the pointer 12, transparent material is used for the dial plate.

e) It is also possible to rotatably support the shaft of the pointer body by the bearing, and to directly rotate the shaft of the pointer body by the rotation driving mechanism including the coil, stator and rotor, without using gears such as the rotor gear 32a, the intermediate gear 33 and the output gear 34.

Industrial Applicability

By employing the output gear and the bearing for supporting the output gear in the pointer illumination structure according to the invention, the invention is useful in achieving simplification of production, and reduction of weight of the rotary part including the pointer body.

REFERENCE SIGNS LIST

1 Pointer movement
10 Pointer body
10a Reflection face at an upper end of a shaft of the pointer body
11 Shaft of the pointer body
11a Incident face of the shaft of the pointer body
12 Pointer
13 Light source
20 Containing cover
21 Upper cover
21a Tubular protruding part
22 Lower cover
22a Bearing of a rotor
22b Bearing of an intermediate gear
22c Bearing
31 Coil stator assembly (a part of a rotation driving mechanism)
31a Coil
31b Stator
32 Rotor (a part of the rotation driving mechanism)
32a Rotor gear
33 Intermediate gear (a part of the rotation driving mechanism)
34 Output gear
34a Protruding part of the output gear
41a Rotor shaft (a part of the rotation driving mechanism)
41b Intermediate gear shaft (a part of the rotation driving mechanism)
A Through hole in the output gear
M Rotation driving mechanism

The invention claimed is:

1. A pointer illumination structure, comprising:
a pointer body which includes a shaft and a pointer for indicating a measuring value according to its rotation around the shaft;
a bearing which rotatably supports the shaft of the pointer body;
a rotation driving mechanism for rotating the pointer body which is supported by the bearing;
a containing cover which contains the rotation driving mechanism; and
a light source for illuminating the pointer of the pointer body, wherein
the bearing is formed of a light-transmissive material through which a light from the light source can pass, and the bearing is integrally formed with the containing cover at a position more adjacent to the light source than the shaft of the pointer body, on an optical path of the light.

2. The pointer illumination structure as claimed in claim 1, comprising an output gear to which the rotation is transmitted from the rotation driving mechanism, a through hole being formed in the output gear, wherein
the bearing is in a shape protruding from the containing cover toward the pointer body, and inserted into one end side of the through hole of the output gear thereby to rotatably support the output gear, and
the shaft of the pointer body is inserted into the other end side of the through hole of the output gear to be fixedly attached to the output gear.

3. The pointer illumination structure as claimed in claim 2, wherein
the containing cover includes a lower cover which is integrally formed with the bearing, and an upper cover which is provided with a tubular protruding part protruding toward the pointer body, and
a protruding part of the output gear which defines the other end side of the through hole of the output gear is engaged with an inside of the tubular protruding part.

* * * * *